United States Patent

Atkinson et al.

[11] Patent Number: 4,662,242
[45] Date of Patent: May 5, 1987

[54] TRANSAXLE WITH MULTI-STAGE FINAL DRIVE ASSEMBLY

[75] Inventors: Robert W. Atkinson; Jack M. Fisher, both of Muncie, Ind.

[73] Assignee: Borg-Warner Automotive, Inc., Troy, Mich.

[21] Appl. No.: 793,888

[22] Filed: Nov. 1, 1985

[51] Int. Cl.$^4$ ............................................. F16H 37/08
[52] U.S. Cl. ........................................ 74/701; 74/359; 74/363
[58] Field of Search ............... 74/359, 360, 362, 363, 74/701, 740

[56] References Cited

U.S. PATENT DOCUMENTS

| | | | |
|---|---|---|---|
| 1,459,026 | 6/1923 | Kocher | 74/701 |
| 2,306,545 | 12/1942 | Kummich | 74/327 |
| 2,326,754 | 8/1943 | Buckendale | 74/701 X |
| 2,351,590 | 6/1944 | Alden et al. | 74/701 |
| 2,791,771 | 5/1957 | Schou | 74/701 X |
| 4,232,569 | 11/1980 | Hauser et al. | 74/701 |
| 4,377,093 | 3/1983 | Janson | 74/359 X |
| 4,449,424 | 5/1984 | Hauser | 74/701 |

FOREIGN PATENT DOCUMENTS

| | | | |
|---|---|---|---|
| 1141541 | 12/1962 | Fed. Rep. of Germany | 74/359 |
| 33948 | 3/1980 | Japan | 74/740 |
| 173639 | 10/1982 | Japan | 74/740 |
| 173640 | 10/1982 | Japan | 74/740 |

Primary Examiner—Leslie Braun
Assistant Examiner—Dwight G. Diehl
Attorney, Agent, or Firm—Julian Schachner; Herman E. Smith

[57] ABSTRACT

A transaxle includes a multi-stage final drive assembly with the final drive assembly with a plurality of serial stages. The transaxle has an input, a plurality of gear sets selectively engageable for directing power from the input to the first stage of the final drive assembly, and another gear set engageable for directing power from the input to another stage of the final drive assembly thereby by-passing the first stage thereof.

3 Claims, 3 Drawing Figures

TRANSAXLE WITH MULTI-STAGE FINAL DRIVE ASSEMBLY

BACKGROUND OF THE INVENTION

This invention relates generally to a transaxle. More particularly, it is directed to a transaxle which incorporates a multi-stage final drive assembly. The transaxle is especially adapted for use in a modern, downsized front-wheel drive vehicle.

In rear-wheel-drive vehicles, the size of the transmission, final drive assembly and differential generally are not critical. However, as modern vehicles are downsized and designed for front-wheel drive, these components, collectively referred to as a transaxle, are packaged in a single housing and, along with other components, are enclosed in the engine compartment between the front wheels. As space in the engine compartment is at a premium, the size of the housing package is critical.

In addition, it is recognized generally today that the provision of an overdrive speed ratio is an important feature in a transmission. In the typical manual transmission, it is desirable to provide five forward speed ratios and a reverse speed ratio, with fifth being an overdrive ratio. To provide overdrive, an overdrive gear set produces a speed increase. Power then is directed to the final drive assembly which, in turn, produces a speed reduction. If it were possible to avoid this increase and reduction, the size of the gears, and thus the housing package of the transaxle could be made more compact.

There is a need in the art for a transaxle which includes an overdrive speed ratio, but which minimizes the sizes of the gears, thereby optimizing the entire housing package.

SUMMARY OF THE INVENTION

This invention is directed to meeting this need. To that end, there is disclosed a transaxle including a transmission and a multi stage final drive assembly. The final drive assembly has a plurality of serial stages. The transmission has an input, a plurality of gear sets selectively engageable for directing power from the input to the first stage of the final drive assembly, and another gear set engageable for directing power from the input to another stage of the final drive assembly thereby bypassing the first stage thereof.

BRIEF DESCRIPTION OF THE DRAWINGS

The objects and advantages of this invention will become apparent to those skilled in the art upon careful consideration of the specification herein, including the drawings, wherein.

Figure 1:
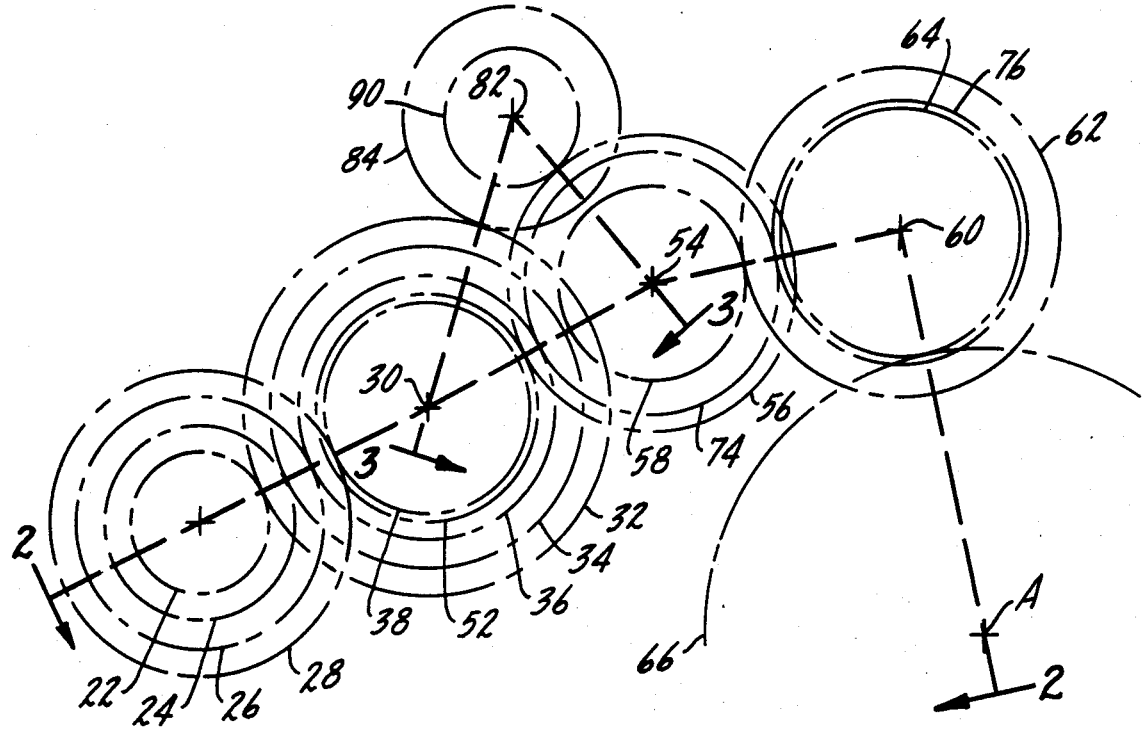
FIG. 1 is a schematic illustration showing the orientation of the various shafts and gears of the transaxle of this invention.

While this invention is susceptible of embodiment in many different forms, there is shown in the drawings and herein describe in detail the preferred embodiment. It should be understood that the present disclosure is considered to be an exemplification of the principles of the invention, and is not intended to limit the invention to this embodiment.

DESCRIPTION OF THE PREFERRED EMBODIMENT

Figure 2:
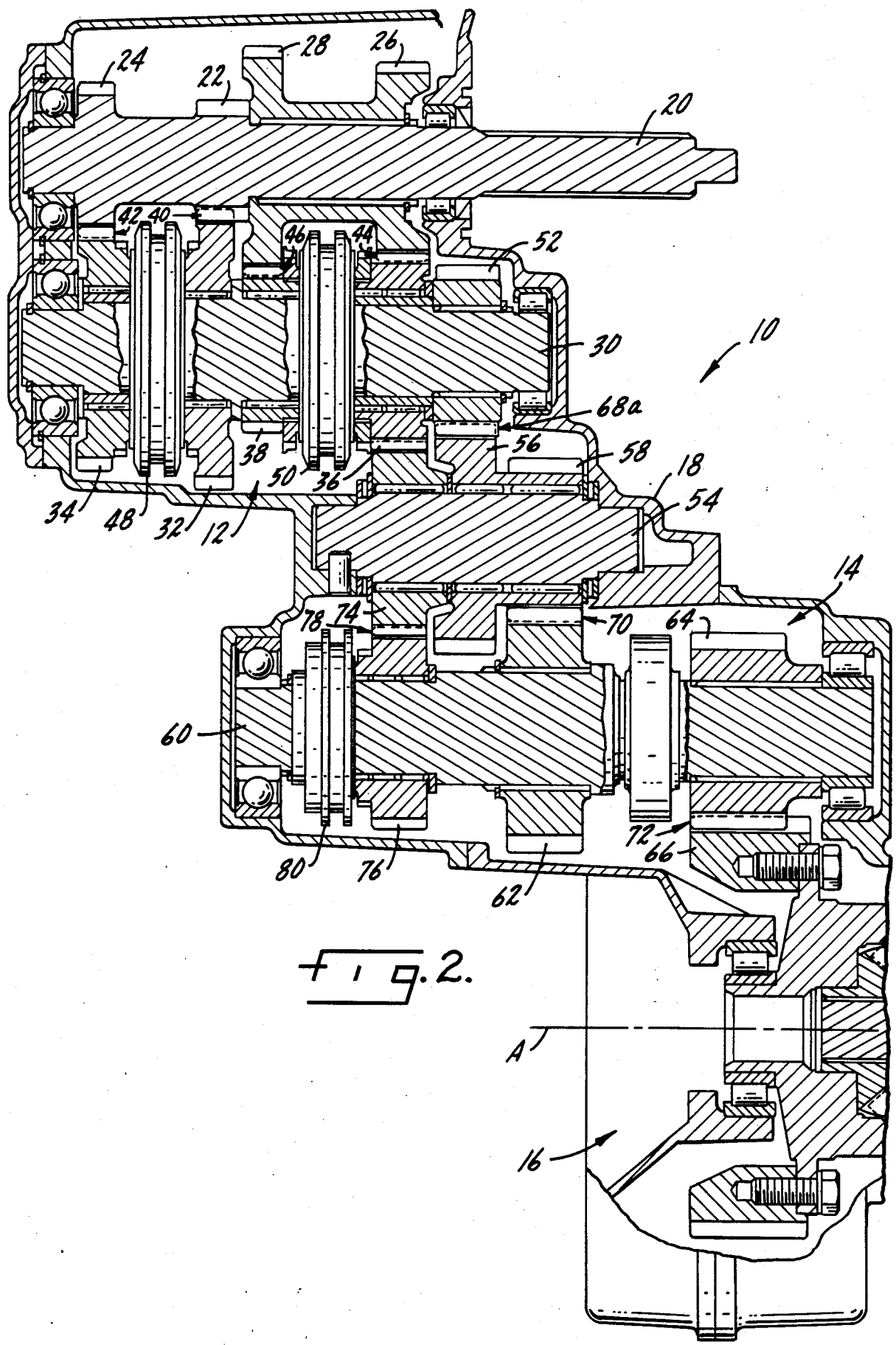
FIG. 2 is a sectional view taken along the line 2—2 of FIG. 1, with the various shafts revolved into a single plane for clarity.

Referring now to the drawings in greater detail, and to FIGS. 1 and 2 in particular, there is shown generally a transaxle 10 which is particularly adapted for use in a front-wheel drive automotive vehicle. Transaxle 10 includes a transmission component 12, in this case a manual transmission, a multi-stage final drive assembly component 14, and a differential component 16. These components of transaxle 10 are enclosed in a single housing package 18.

Transmission 12 includes an input shaft 20 supported for rotation in housing 18. Shaft 20 is adapted to receive power from an associated engine (not shown). Secured to shaft 20 are a first ratio drive gear 22, a second ratio drive gear 24, a third ratio drive gear 26, and a fourth ratio drive gear 28.

A mainshaft 30 also is supported for rotation in housing 18. Journaled on shaft 30 are a first ratio driven gear 32 in mesh with gear 22, a second ratio driven gear 34 in mesh with gear 24, a third ratio driven gear 36 in mesh with gear 26, and a fourth ratio driven gear 38 in mesh with gear 28. Gears 22 and 32 together comprise a first forward speed ratio gear set 40. Gears 24 and 34 together comprise a second forward speed ratio gear set 42. Gears 26 and 36 together comprise a third forward speed ratio gear set 44. Gears 28 and 38 together comprise a fourth forward speed ratio gear set 46.

First and second synchronizers 48 and 50, respectively, are supported on shaft 30. As shown in FIG. 2, the collar of synchronizer 48 is movable to the right to lock gear 32 to shaft 30, thereby engaging first forward gear set 40, and is movable to the left to lock gear 34 to shaft 30, thereby engaging second forward gear set 42. Similarly, the collar of synchronizer 50 is movable to the right to lock gear 36 to shaft 30, thereby engaging third forward gear set 44, and is movable to the left to lock gear 38 to shaft 30, thereby engaging fourth forward gear set 46.

Transmission 12 also includes overdrive and reverse features to be described.

The multi-stage final drive assembly 14 provides three stages of speed reduction. A first stage forward input gear 52 is secured to shaft 30. An intermediate shaft 54 is non-rotatably supported in housing 18. Journaled on shaft 54 are a first stage output gear 56 in mesh with gear 52, and a second stage input gear 58. Gears 56 and 58 are formed as a compound gear.

A transfer shaft 60 is supported for rotation in housing 18. A second stage output gear 62 is secured to shaft 60 in mesh with gear 58. A third stage input gear 64 also is secured to shaft 60. A third stage output gear 66, in mesh with gear 64, preferably is the input gear of differential 16. Differential 16 is conventional, and drives a pair of axle half-shafts (not shown) oriented for rotation on an axis A.

Gears 52 and 56 together comprise the forward portion 68a of a final drive first stage gear set 68a,b. Gears 58 and 62 together comprise a final drive second stage gear set 70. Gears 64 and 66 together comprise a final drive third stage gear set 72. Multi-stage final drive assembly 14 includes gear sets 68a, 70 and 72 arranged in series to receive power from transmission 12, and to deliver power to differential 16.

The overdrive feature of transmission 12 includes a fifth ratio drive gear 74 journaled on intermediate shaft 54 in mesh with gear 36 of gear set 44, and a fifth ratio driven gear 76 journaled on shaft 60 in mesh with gear 74. Gears 74 and 76 together comprise a fifth, overdrive forward speed ratio gear set 78.

A third synchronizer 80 is supported on shaft 60. As shown in FIG. 2, the collar of synchronizer 80 is movable to the right to lock gear 76 to shaft 60, thereby engaging fifth forward gear set 78.

Figure 3:
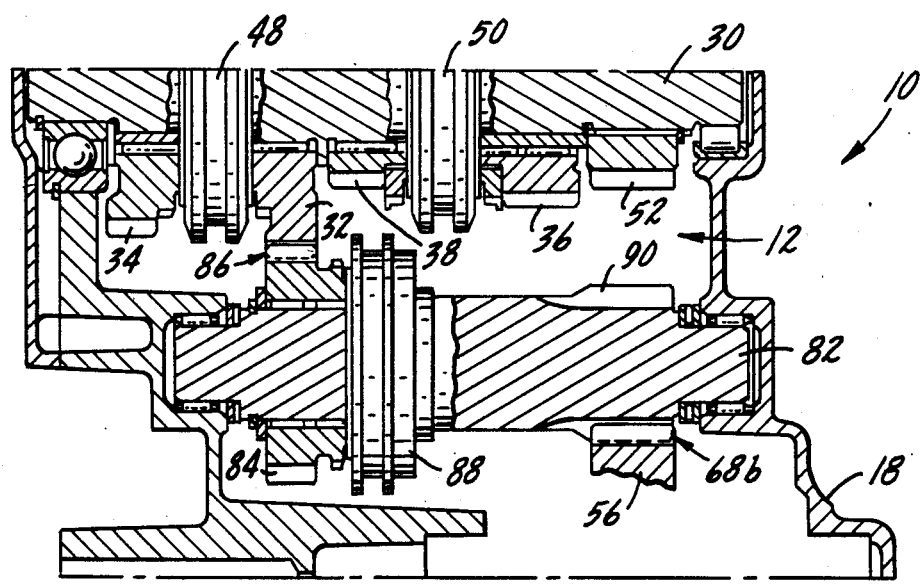
FIG. 3 is a sectional view similar to FIG. 2, taken along the line 3—3 of FIG. 1, showing additional details of the transaxle.

With particular reference to FIG. 3, the reverse feature of transmission 12 includes a reverse shaft 82 supported for rotation in housing 18. A reverse idler gear 84 is journaled on shaft 82 in mesh with gear 32 of gear set 40. Gears 32 and 84 together comprise a reverse gear set 86.

A fourth synchronizer 88 is supported on shaft 82. As shown in FIG. 3, the collar of synchronizer 88 is movable to left to lock gear 84 to shaft 82, thereby engaging reverse gear set 86.

A first stage reverse input gear 90, secured to shaft 82, is in mesh with gear 56. Gears 90 and 56 together comprise the reverse portion 68b of final drive first stage gear set 68a,b.

OPERATION OF THE PREFERRED EMBODIMENT

With particular reference to FIG. 2, movement of the collar of synchronizer 48 to right establishes the first forward speed ratio. Drive is from input shaft 20 through gear set 40 and shaft 30 to gear sets 68a, 70 and 72 of final drive assembly 14, and then to differential 16. Movement of the collar of synchronizer 48 to the left establishes the second forward speed ratio. Drive is from input shaft 20 through gear set 42 and shaft 30 to final drive assembly 14 and differential 16. Similarly, movement of the collar of synchronizer 50 to the right establishes the third forward speed ratio. Drive is from input shaft 20 through gear set 44 and shaft 30 to final drive assembly 14 and differential 16. Movement of the collar of synchronizer 50 to the left establishes the fourth forward speed ratio. Drive is from input shaft 20 through gear set 46 and shaft 30 to final drive assembly 14 and differential 16.

With reference to FIG. 3, the reverse speed ratio is established when the collar of synchronizer 88 is moved to the left. Drive is from input shaft 20 through gear sets 40 and 86 to shaft 82. From this shaft, drive is directed through gear sets 68b, 70 and 72 of final drive assembly 14, and then to differential 16.

In each of these cases, power from transmission 12 is directed through all three stages of final drive assembly 14; that is, drive is from shaft 30 through gear sets 68a,b, 70 and 72. These three stages provide the maximum speed reduction available in final drive assembly 14, with the result that differential 16 receives power at the proper axle ratio.

With reference to FIG. 2, movement of the collar of synchronizer 80 to the right establishes the fifth, overdrive forward speed ratio. Drive is from input shaft 20 through gear sets 44 and 78 and shaft 60 to the last stage of final drive assembly 14; that is, from shaft 60 directly to gear set 72, by-passing gear sets 68a and 70, and then to differential 16.

The overall overdrive ratio produced by gear sets 44 and 78 need not be as large as would be necessary if drive were directed through all three stages of final drive assembly 14. On the other hand, with three stages of reduction in final drive assembly 14, the reduction ratios produced by gear sets 40, 42, 44, 46 and 86 need not be as large as would otherwise be necessary. Finally, gear 66 may be smaller than would otherwise be necessary. The end result is that the housing package 18 of transaxle 10 may be quite compact.

Further, the layout is such that differential 16 may be oriented midway between the front wheels of the vehicle. Those skilled in the art will appreciate that this improves the handling characteristics of the vehicle.

Thus it will be apparent that the invention disclosed herein provides a transaxle which includes four forward speed ratios, an overdrive speed ratio and a reverse speed ratio. In all of the speed ratios except overdrive, the flow of power is through all of the speed reduction stages of a multi-stage final drive assembly. The overdrive speed ratio bypasses at least one stage of the final drive assembly. This allows placement of the transaxle in a housing package which is optimized for the engine compartment of a modern, downsized front-wheel-drive vehicle.

Although the invention herein is described with reference to a manual transaxle, it will be appreciated by those skilled in the art that it is also applicable for use in a automatic transaxle.

Finally, although the invention is described with reference to gear sets, it should be understood that chain/sprocket drives, belt/pulley drives, etc. may be used in place of one or more gear sets without departing from the inventive concept herein.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. A transaxle including a transmission, a multi-stage final drive assembly, and a differential, said transmission including first, second, third, fourth and fifth forward gear sets and a reverse gear set selectively engageable for directing power from an input to said final drive assembly at first, second, third, fourth and fifth forward speed ratios and a reverse speed ratio, said multistage final drive assembly including first, second and third final drive gear sets connected in series, said first, second, third and fourth forward gear sets and said reverse gear set being engageable to deliver power to said differential through said first, second and third final drive gear sets, said fifth forward gear set being engageable to deliver power to said differential solely through said third final drive gear set.

2. A transaxle comprising a housing, input, main, transfer and reverse shafts supported for rotation in said housing, an intermediate shaft non-rotatably supported in said housing, first, second, third and fourth drive gears secured to said input shaft, first, second, third and fourth driven gears journaled on said mainshaft in mesh respectively with said first, second, third and fourth drive gears, first and second synchronizers movable selectively for locking said first, second, third and fourth driven gears to said mainshaft, a first stage forward input gear secured to said mainshaft, a compound gear journaled on said intermediate shaft, said compound gear including a first stage output gear in mesh with said first stage forward input gear, and a second stage input gear, a fifth drive gear journaled on said intermediate shaft in mesh with said third driven gear, a second stage output gear secured to said transfer shaft in mesh with said second stage input gear, a fifth driven gear journaled on said transfer shaft in mesh with said fifth drive gear, a third synchronizer movable for locking said fifth driven gear to said transfer shaft, a third stage input gear secured to said transfer shaft, a reverse idler gear journaled on said reverse shaft in mesh with said first driven gear, a fourth synchronizer movable for locking said reverse idler gear to said reverse shaft, and a first stage reverse drive gear secured to said reverse shaft in mesh with said first stage output gear.

3. The transaxle of claim 2, further comprising a differential, a third stage output gear in mesh with said third stage input gear, said third stage output gear being the input gear of said differential.

* * * * *